Figure 1:
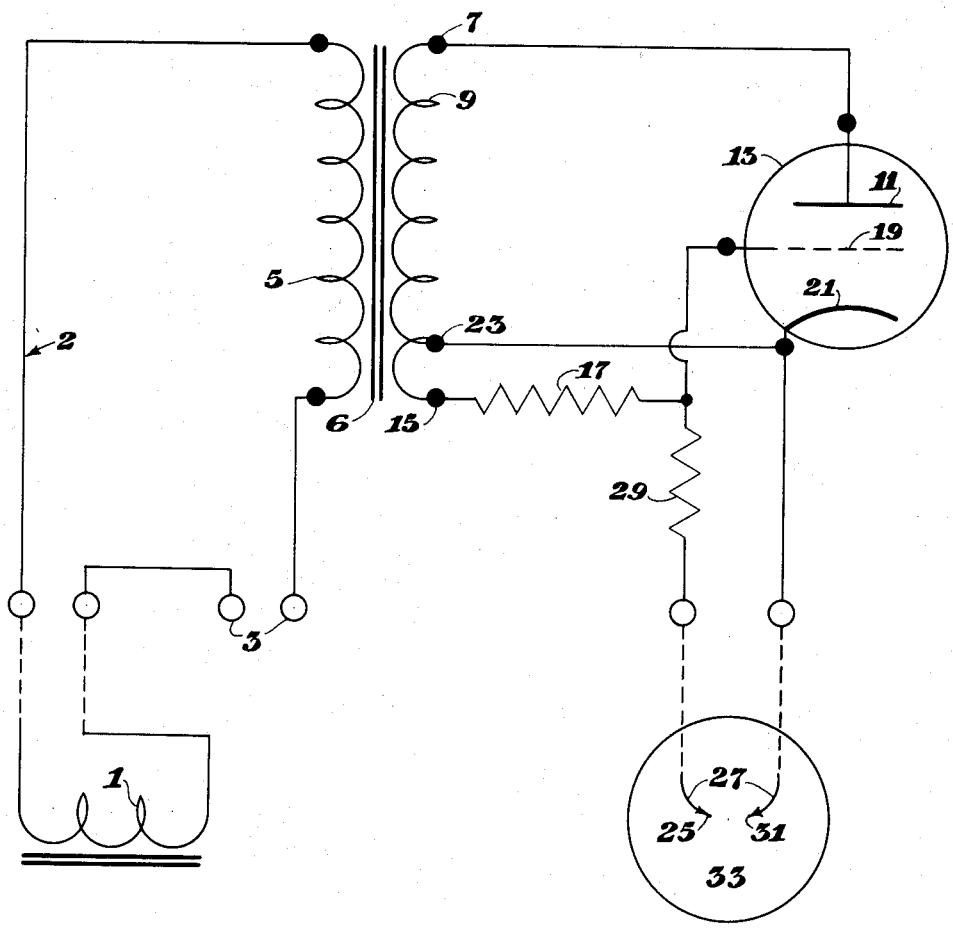

Patented Oct. 10, 1950

2,525,593

UNITED STATES PATENT OFFICE 2,525,593

ELECTRONIC CONTROL DEVICE

Lynn E. Ellison, Evanston, Ill., assignor to The Pure Oil Company, Chicago, Ill., a corporation of Ohio Application February 23, 1946, Serial No. 649,588

3 Claims. (Cl. 250—27)

This invention relates to a device for controlling an electric circuit in accordance with predetermined conditions. More particularly, the invention relates to an electronic control device for operating an electromagnetic relay which, in turn, opens and closes a circuit in accordance with predetermined conditions.

An object of the invention is to provide an electronic relay control.

Another object of the invention is to provide an electric control circuit in which the current through the control element is so small that sparking and pitting of the contact points of the control is avoided, thereby imparting longer life and greater accuracy to the control element.

A still further object of the invention is to provide an electronic control device of simple construction and low cost in which sensitive relays are eliminated from the secondary circuit.

Still another object of the invention is to provide an electronic relay control which eliminates the lag incident to the use of cascaded relays in the secondary circuit.

Other objects of the invention will become apparent from the following description and the accompanying drawing, in which the single figure is a diagrammatic illustration of the circuit used in the construction of my novel control device.

Referring to the drawing, numeral 1 indicates a relay coil adapted to operate electrical contacting devices, solenoid valves, etc., by a magnetic field set up in the coil when the coil is energized by current passing therethrough. The coil 1 is connected in the primary alternating current circuit 2 obtaining alternating current from a source 3. Primary winding 5 of a transformer 6 is also connected in the primary circuit.

One end 7 of the secondary winding 9 of the transformer is connected to plate or anode 11 of an electronic tube 13. The other end 15 of the secondary 9 is connected through resistor 17 to the grid 19 of the electronic tube. The electronic tube 13 is connected in such a way that the voltage of the grid is normally 180° out of phase with the plate voltage. Cathode 21 of the electronic tube 13 is connected to the secondary of the transformer at the point 23 between ends 7 and 15. Contact point 25 of the control element 27 is connected to the end 15 of the transformer secondary through resistors 17 and 29, and is connected to the grid 19 of electronic tube 13 through resistor 29. Contact point 31 of the control element is connected to the cathode 21 and to the point 23 of the transformer secondary. The control element is adapted to operate at low potential and low current ratings.

In order to explain the operation of the device it will be described in conjunction with the use of the device in operating an electric heating element, but it should be understood that the device is useful in connection with the operation of any element which is adapted to be operated electrically, and is useful in connection with any control element which is adapted to make and break an electric circuit at predetermined conditions of the instrumentality to be operated.

Assume that the control element is a thermoregulator the contact points 25 and 31 of which are adapted to open and close the circuit in which the control element is connected. Assume also the thermo-regulator is placed in a bath 33 the temperature of which is to be regulated. When the temperature of the bath reaches a predetermined figure, the contact points 25 and 31 open, thereby causing the tube 13 to cease to conduct current and hence breaking the secondary circuit. Because of the fact that the A. C. bias voltage on the grid is of sufficient magnitude and normally 180° out of phase with the plate voltage, current will not normally flow through the tube when the contact points of the thermo-regulator are open. The tube will pass current and cause current to flow through the portion of the secondary winding between points 7 and 23 only when the contact points 25 and 31 are closed. Closing of the contact points of the thermo-regulator reduces the A. C. bias voltage on the grid of the electronic tube, thereby permitting the tube to pass current.

If the secondary circuit is open because the points 25 and 31 are not contacting each other and as a result no current can flow through the secondary circuit, sufficient inductance will be present in the primary circuit so that only a very small amount of current flows through the primary winding 5, and hence through the entire primary circuit. As a result, the current flowing through relay coil 1 is insufficient to actuate the relay (not shown), which is held in open position by a spring, and close a separate circuit containing the heating element which heats the bath 33.

On the other hand, when the temperature in the bath drops below a predetermined selected figure, the contact points 25 and 31 of the thermo-regulator close, thereby causing the tube 13 to conduct current and hence completing the secondary circuit, permitting current to flow therethrough and substantially decreasing the inductance of the transformer. This decrease in inductance permits more current to flow through the primary winding 5, and hence through the entire primary circuit. An increase in current in the primary circuit produces a sufficient magnetic field to actuate the relay and close the heater circuit, whereupon the bath in which the thermo-regulator is immersed is heated until the desired temperature is reached, whereupon the contact points open, causing a drop in primary current and permitting the spring operated relay to return to open position.

Either a hot or cold cathode electronic tube of the gaseous discharge type may be used in the secondary circuit. In the event a hot cathode tube is used it will be necessary to provide a heating element beneath the cathode. The heating element may be heated by current taken from the secondary of a transformer whose primary is connected to the source 3.

The combined resistance of resistors 17 and 29 should be sufficiently great to prevent short circuiting through the thermo-regulator.

As previously pointed out, the device can be used for operations other than heat regulation. For example, if it is desired to regulate the speed of a motor the control element instead of being a thermo-regulator may be a governor equipped with contact points which are adapted to open at a predetermined speed and close when the speed drops below the predetermined speed. The relay may be actuated by the relay coil and open and close a circuit in which the motor to be regulated is connected. Likewise, solenoid-actuated valves in fluid flow or gas lines can be operated directly in the primary circuit of the device, using a thermo-regulator or governor as the control element, provided the impedance of the operating coil is of the proper value.

It is claimed:

1. An electronic relay control comprising, a transformer connected to a power source and having a primary and secondary coil, load terminals in series with the primary of said transformer, a grid controlled vacuum tube having its plate connected to one terminal of said secondary, and its cathode connected to said secondary at an intermediate tap, the grid of said tube being connected through a resistor to the end tap of said secondary, and contact terminals connected between the grid and the cathode of said tube through a resistor and responsive to the effect to be controlled to alter the grid circuit and decrease the grid voltage to cause said tube to pass current.

2. An electric control device in accordance with claim 1 in which the contact means is included in a thermo-regulator.

3. An electric control device in accordance with claim 1 in which the control element is included in a speed governor.

LYNN E. ELLISON.

REFERENCES CITED

The following references are of record in the file of this patent:

UNITED STATES PATENTS

| Number | Name | Date |
| --- | --- | --- |
| 1,571,304 | Sindeband | Feb. 2, 1926 |
| 1,935,413 | Prince | Nov. 14, 1933 |
| 2,084,870 | Schmidt, Jr. | June 22, 1937 |
| 2,086,594 | Young | July 13, 1937 |
| 2,109,776 | Johnson | Mar. 1, 1938 |
| 2,114,345 | Hayford | Apr. 19, 1938 |
| 2,141,942 | Suits | Dec. 27, 1938 |
| 2,166,309 | Lord | July 18, 1939 |
| 2,202,172 | Stoller | May 28, 1940 |
| 2,256,760 | Johnson | Sept. 23, 1941 |
| 2,399,266 | Stiefel | Apr. 30, 1946 |

FOREIGN PATENTS

| Number | Country | Date |
| --- | --- | --- |
| 661,540 | Germany | June 21, 1938 |